United States Patent
Dinker

(10) Patent No.: US 9,135,064 B2
(45) Date of Patent: Sep. 15, 2015

(54) FINE GRAINED ADAPTIVE THROTTLING OF BACKGROUND PROCESSES

(75) Inventor: Darpan Dinker, Fremont, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 525 days.

(21) Appl. No.: 13/413,814

(22) Filed: Mar. 7, 2012

(65) Prior Publication Data

US 2013/0239114 A1    Sep. 12, 2013

(51) Int. Cl.
*G06F 9/46* (2006.01)
*G06F 9/50* (2006.01)
*G06F 9/48* (2006.01)

(52) U.S. Cl.
CPC .............. *G06F 9/50* (2013.01); *G06F 9/4881* (2013.01); *G06F 9/5011* (2013.01); *G06F 2209/504* (2013.01); *Y02B 60/142* (2013.01)

(58) Field of Classification Search
CPC ..... G06F 9/5016; G06F 9/505; G06F 9/5044; G06F 9/5022; G06F 9/5027
See application file for complete search history.

(56) References Cited

U.S. PATENT DOCUMENTS

| | | | |
|---|---|---|---|
| 4,916,605 A | 4/1990 | Beardsley et al. |
| 5,046,002 A | 9/1991 | Takashi et al. |
| 5,057,996 A | 10/1991 | Cutler et al. |
| 5,117,350 A | 5/1992 | Parrish et al. |
| 5,212,789 A | 5/1993 | Rago |
| 5,287,496 A | 2/1994 | Chen et al. |
| 5,297,258 A | 3/1994 | Hale et al. |
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Unknown Author, Supermicro—Intel Itanium Processor 9300 Series Based Server Systems. www.supermicro.com/products/nfo/itanium.cfm, Jul. 8, 2010.*

(Continued)

*Primary Examiner* — Lewis A Bullock, Jr.
*Assistant Examiner* — Kevin X Lu
(74) *Attorney, Agent, or Firm* — Morgan, Lewis & Bockius LLP

(57) ABSTRACT

Approaches for throttling backgrounds processes to a high degree of precision. The utilization of a shared resource that is used by one or more background processes is monitored. A frequency at which the one or more background processes are executed is dynamically adjusted based on the current utilization of the shared resource without adjusting the frequency in which one or more foreground processes are executed to ensure that the utilization of the shared resource does not exceed a threshold value. The monitoring of the utilization of the shared resource may be performed more often than the adjusted of the frequency at which the background processes are executed, and the utilization of the shared resources may be performed many times a second. Consequently, the utilization of the shared resource may be above a certain level (such as 65%) and less than another level, such as 90%, when background processes are executing.

20 Claims, 4 Drawing Sheets

(56) References Cited

U.S. PATENT DOCUMENTS

| | | | |
|---|---|---|---|
| 5,603,001 A | 2/1997 | Sukegawa et al. | |
| 5,611,057 A | 3/1997 | Pecone et al. | |
| 5,613,071 A | 3/1997 | Rankin et al. | |
| 5,680,579 A | 10/1997 | Young et al. | |
| 5,692,149 A | 11/1997 | Lee | |
| 5,701,480 A | 12/1997 | Raz | |
| 5,742,787 A | 4/1998 | Talreja | |
| 5,887,138 A | 3/1999 | Hagersten et al. | |
| 5,897,661 A | 4/1999 | Baranovsky et al. | |
| 5,897,664 A | 4/1999 | Nesheim et al. | |
| 5,960,436 A | 9/1999 | Chang et al. | |
| 5,963,983 A | 10/1999 | Sakakura et al. | |
| 6,000,006 A | 12/1999 | Bruce et al. | |
| 6,023,745 A | 2/2000 | Lu | |
| 6,052,815 A | 4/2000 | Zook | |
| 6,130,759 A | 10/2000 | Blair | |
| 6,141,692 A | 10/2000 | Loewenstein et al. | |
| 6,151,688 A * | 11/2000 | Wipfel et al. | 714/48 |
| 6,216,126 B1 | 4/2001 | Ronstrom | |
| 6,298,390 B1 | 10/2001 | Matena et al. | |
| 6,308,169 B1 | 10/2001 | Ronstrom et al. | |
| 6,434,144 B1 | 8/2002 | Romanov | |
| 6,467,060 B1 | 10/2002 | Malakapalli et al. | |
| 6,615,313 B2 | 9/2003 | Kato et al. | |
| 6,658,526 B2 | 12/2003 | Nguyen et al. | |
| 6,704,835 B1 | 3/2004 | Garner | |
| 6,728,826 B2 | 4/2004 | Kaki et al. | |
| 6,745,209 B2 | 6/2004 | Holenstein et al. | |
| 6,804,766 B1 | 10/2004 | Noel et al. | |
| 6,874,044 B1 | 3/2005 | Chou et al. | |
| 6,938,084 B2 | 8/2005 | Gamache et al. | |
| 6,944,699 B1 | 9/2005 | Bugnion et al. | |
| 6,981,070 B1 | 12/2005 | Luk et al. | |
| 7,003,586 B1 | 2/2006 | Bailey et al. | |
| 7,010,521 B2 | 3/2006 | Hinshaw et al. | |
| 7,043,621 B2 | 5/2006 | Merchant et al. | |
| 7,082,481 B2 | 7/2006 | Lambrache et al. | |
| 7,162,467 B2 | 1/2007 | Eshleman et al. | |
| 7,200,718 B2 | 4/2007 | Duzett | |
| 7,203,890 B1 | 4/2007 | Normoyle | |
| 7,249,280 B2 | 7/2007 | Lamport et al. | |
| 7,251,749 B1 | 7/2007 | Fong et al. | |
| 7,269,708 B2 | 9/2007 | Ware | |
| 7,269,755 B2 | 9/2007 | Moshayedi et al. | |
| 7,272,605 B1 | 9/2007 | Hinshaw et al. | |
| 7,272,654 B1 | 9/2007 | Brendel | |
| 7,281,160 B2 | 10/2007 | Stewart | |
| 7,305,386 B2 | 12/2007 | Hinshaw et al. | |
| 7,334,154 B2 | 2/2008 | Lorch et al. | |
| 7,359,927 B1 | 4/2008 | Cardente | |
| 7,383,290 B2 | 6/2008 | Mehra et al. | |
| 7,406,487 B1 | 7/2008 | Gupta et al. | |
| 7,415,488 B1 | 8/2008 | Muth et al. | |
| 7,417,992 B2 | 8/2008 | Krishnan | |
| 7,436,771 B2 * | 10/2008 | Roberts et al. | 370/235 |
| 7,467,265 B1 | 12/2008 | Tawri et al. | |
| 7,529,882 B2 | 5/2009 | Wong | |
| 7,542,968 B2 | 6/2009 | Yokomizo et al. | |
| 7,562,162 B2 | 7/2009 | Kreiner et al. | |
| 7,584,222 B1 | 9/2009 | Georgiev | |
| 7,610,445 B1 | 10/2009 | Manus et al. | |
| 7,623,494 B2 * | 11/2009 | Zhu et al. | 370/333 |
| 7,627,618 B2 * | 12/2009 | Honigfort | 1/1 |
| 7,647,449 B1 | 1/2010 | Roy et al. | |
| 7,657,710 B2 | 2/2010 | Loewenstein | |
| 7,809,691 B1 | 10/2010 | Karmarkar et al. | |
| 7,822,711 B1 | 10/2010 | Ranade | |
| 7,885,923 B1 | 2/2011 | Tawri et al. | |
| 7,917,472 B2 | 3/2011 | Persson | |
| 8,015,352 B2 | 9/2011 | Zhang et al. | |
| 8,018,729 B2 | 9/2011 | Skinner | |
| 8,024,515 B2 | 9/2011 | Auerbach et al. | |
| 8,037,349 B2 | 10/2011 | Mandagere et al. | |
| 8,069,328 B2 | 11/2011 | Pyeon | |
| 8,099,391 B1 | 1/2012 | Monckton | |
| 8,103,643 B2 | 1/2012 | Danilov et al. | |
| 8,161,248 B2 | 4/2012 | Blumrich et al. | |
| 8,205,206 B2 * | 6/2012 | Ozer et al. | 718/103 |
| 8,225,053 B1 | 7/2012 | McCorkendale et al. | |
| 8,239,617 B1 | 8/2012 | Linnell | |
| 8,261,266 B2 * | 9/2012 | Pike et al. | 718/1 |
| 8,261,289 B2 | 9/2012 | Kasravi et al. | |
| 8,321,450 B2 | 11/2012 | Thatte et al. | |
| 8,335,776 B2 | 12/2012 | Gokhale | |
| 8,356,306 B2 * | 1/2013 | Herington | 718/104 |
| 8,370,853 B2 | 2/2013 | Giampaolo et al. | |
| 8,401,994 B2 | 3/2013 | Hoang et al. | |
| 8,504,526 B2 | 8/2013 | Gokhale et al. | |
| 8,666,939 B2 | 3/2014 | O'Krafka et al. | |
| 8,671,074 B2 | 3/2014 | Wang et al. | |
| 8,683,468 B2 * | 3/2014 | Bachar et al. | 718/104 |
| 2001/0032253 A1 | 10/2001 | Duxbury | |
| 2002/0089933 A1 * | 7/2002 | Giroux et al. | 370/236 |
| 2002/0129192 A1 | 9/2002 | Spiegel et al. | |
| 2002/0166031 A1 | 11/2002 | Chen et al. | |
| 2002/0184239 A1 | 12/2002 | Mosher, Jr. et al. | |
| 2003/0016596 A1 | 1/2003 | Chiquoine et al. | |
| 2003/0097610 A1 | 5/2003 | Hofner | |
| 2003/0177408 A1 | 9/2003 | Fields et al. | |
| 2003/0220985 A1 | 11/2003 | Kawamoto et al. | |
| 2004/0010502 A1 | 1/2004 | Bomfim et al. | |
| 2004/0078379 A1 | 4/2004 | Hinshaw et al. | |
| 2004/0143562 A1 | 7/2004 | Chen et al. | |
| 2004/0148283 A1 | 7/2004 | Harris et al. | |
| 2004/0172494 A1 | 9/2004 | Pettey et al. | |
| 2004/0172577 A1 | 9/2004 | Tan et al. | |
| 2004/0205151 A1 | 10/2004 | Sprigg et al. | |
| 2004/0230862 A1 | 11/2004 | Merchant et al. | |
| 2004/0267835 A1 | 12/2004 | Zwilling et al. | |
| 2005/0005074 A1 | 1/2005 | Landin et al. | |
| 2005/0021565 A1 | 1/2005 | Kapoor et al. | |
| 2005/0027701 A1 | 2/2005 | Zane et al. | |
| 2005/0028134 A1 | 2/2005 | Zane et al. | |
| 2005/0034048 A1 | 2/2005 | Nemawarkar et al. | |
| 2005/0081091 A1 | 4/2005 | Bartfai et al. | |
| 2005/0086413 A1 | 4/2005 | Lee et al. | |
| 2005/0120133 A1 | 6/2005 | Slack-Smith | |
| 2005/0131964 A1 | 6/2005 | Saxena | |
| 2005/0240635 A1 | 10/2005 | Kapoor et al. | |
| 2005/0246487 A1 | 11/2005 | Ergan et al. | |
| 2006/0059428 A1 | 3/2006 | Humphries et al. | |
| 2006/0064549 A1 * | 3/2006 | Wintergerst | 711/134 |
| 2006/0085594 A1 | 4/2006 | Roberson et al. | |
| 2006/0123200 A1 | 6/2006 | Ito et al. | |
| 2006/0130063 A1 | 6/2006 | Kilian et al. | |
| 2006/0161530 A1 | 7/2006 | Biswal et al. | |
| 2006/0174063 A1 | 8/2006 | Soules et al. | |
| 2006/0174069 A1 | 8/2006 | Shaw et al. | |
| 2006/0179083 A1 | 8/2006 | Kulkarni et al. | |
| 2006/0195648 A1 | 8/2006 | Chandrasekaran et al. | |
| 2006/0212795 A1 | 9/2006 | Cottrille et al. | |
| 2006/0218210 A1 | 9/2006 | Sarma et al. | |
| 2006/0242163 A1 | 10/2006 | Miller et al. | |
| 2006/0253724 A1 | 11/2006 | Zhang | |
| 2007/0038794 A1 | 2/2007 | Purcell et al. | |
| 2007/0043790 A1 | 2/2007 | Kryger | |
| 2007/0043860 A1 * | 2/2007 | Pabari | 709/224 |
| 2007/0073896 A1 | 3/2007 | Rothman et al. | |
| 2007/0143368 A1 | 6/2007 | Lundsgaard et al. | |
| 2007/0156842 A1 | 7/2007 | Vermuelen et al. | |
| 2007/0174541 A1 | 7/2007 | Chandrasekaran et al. | |
| 2007/0234182 A1 | 10/2007 | Wickeraad et al. | |
| 2007/0276784 A1 | 11/2007 | Piedmonte | |
| 2007/0283079 A1 | 12/2007 | Iwamura et al. | |
| 2007/0288692 A1 | 12/2007 | Bruce et al. | |
| 2007/0288792 A1 | 12/2007 | Thorpe et al. | |
| 2007/0294564 A1 | 12/2007 | Reddin et al. | |
| 2007/0299816 A1 | 12/2007 | Arora et al. | |
| 2008/0016300 A1 | 1/2008 | Yim et al. | |
| 2008/0034076 A1 | 2/2008 | Ishikawa et al. | |
| 2008/0034174 A1 | 2/2008 | Traister et al. | |
| 2008/0034249 A1 | 2/2008 | Husain et al. | |
| 2008/0046538 A1 | 2/2008 | Susarla et al. | |
| 2008/0046638 A1 | 2/2008 | Maheshwari et al. | |

(56) References Cited

U.S. PATENT DOCUMENTS

| | | | |
|---|---|---|---|
| 2008/0126706 A1 | 5/2008 | Newport et al. | |
| 2008/0172402 A1* | 7/2008 | Birdwell et al. | 707/101 |
| 2008/0256103 A1* | 10/2008 | Fachan et al. | 707/101 |
| 2008/0288713 A1 | 11/2008 | Lee et al. | |
| 2008/0288819 A1 | 11/2008 | Heller, Jr. | |
| 2008/0295105 A1* | 11/2008 | Ozer et al. | 718/103 |
| 2008/0301256 A1 | 12/2008 | McWilliams | |
| 2009/0006500 A1 | 1/2009 | Shiozawa et al. | |
| 2009/0006681 A1 | 1/2009 | Hubert et al. | |
| 2009/0006888 A1 | 1/2009 | Bernhard et al. | |
| 2009/0019456 A1 | 1/2009 | Saxena et al. | |
| 2009/0024871 A1 | 1/2009 | Emaru et al. | |
| 2009/0030943 A1 | 1/2009 | Kall | |
| 2009/0059539 A1 | 3/2009 | Ryu et al. | |
| 2009/0070530 A1 | 3/2009 | Satoyama et al. | |
| 2009/0150599 A1 | 6/2009 | Bennett | |
| 2009/0177666 A1 | 7/2009 | Kaneda | |
| 2009/0198791 A1 | 8/2009 | Menghnani | |
| 2009/0240664 A1 | 9/2009 | Dinker et al. | |
| 2009/0240869 A1 | 9/2009 | O'Krafka et al. | |
| 2009/0327751 A1 | 12/2009 | Koifman et al. | |
| 2010/0058021 A1 | 3/2010 | Kawamura | |
| 2010/0080057 A1 | 4/2010 | Reuter et al. | |
| 2010/0107017 A1 | 4/2010 | Munjal et al. | |
| 2010/0125695 A1 | 5/2010 | Wu et al. | |
| 2010/0241895 A1 | 9/2010 | Li et al. | |
| 2010/0262762 A1 | 10/2010 | Borchers et al. | |
| 2010/0299490 A1 | 11/2010 | Attarde et al. | |
| 2010/0306448 A1 | 12/2010 | Chen et al. | |
| 2010/0318821 A1 | 12/2010 | Kwan et al. | |
| 2010/0325498 A1 | 12/2010 | Nagadomi | |
| 2011/0022566 A1 | 1/2011 | Beaverson et al. | |
| 2011/0072206 A1 | 3/2011 | Ross et al. | |
| 2011/0082965 A1 | 4/2011 | Koka et al. | |
| 2011/0082985 A1 | 4/2011 | Haines et al. | |
| 2011/0099420 A1 | 4/2011 | MacDonald McAlister | |
| 2011/0167038 A1 | 7/2011 | Wang et al. | |
| 2011/0179279 A1 | 7/2011 | Greevenbosch et al. | |
| 2011/0185147 A1 | 7/2011 | Hatfield et al. | |
| 2011/0191299 A1 | 8/2011 | Huynh Huu et al. | |
| 2011/0225214 A1 | 9/2011 | Guo | |
| 2012/0005154 A1 | 1/2012 | George et al. | |
| 2012/0072449 A1 | 3/2012 | Patch et al. | |
| 2013/0066948 A1 | 3/2013 | Colrain et al. | |
| 2013/0198478 A1* | 8/2013 | Bitner | 711/170 |

OTHER PUBLICATIONS

Ajmani, Automatic Software Upgrades for Distributed Systems, MIT, Sep. 2004, 164 pgs.
Amza, Data Replication Strategies for Fault Tolerance and Availability on Commodity Clusters, 2000, 9 pgs.
Mukherjee et al., Verification of an Industrial CC-NUMA server, Proceedings of ASP-DAC 2002, 7th Asia and South Pacifric and the 15th International Conference on VLSI Design, Jan. 7-11, 2002, 6 pages.
Shacham et al., Verificaiton of chip multiprocessor memory systems using a relaxed scoreboard, Microarchitecture, 2008, MICRO-41, 2008, 41st IEEE/ACM International Symposium, Nov. 8-12, 2008, 12 pages.
Walker, Hash Table Tutorial, Oct. 13, 2007, 14 pgs.
bsn-modulestore, Versioning Concept, Oct. 13, 2010, 2 pgs.
Btrfs, http://en.wikipedia.org, Oct. 3, 2011, 9 pgs.
Buchholz, The Structure of the Reiser File System, Jan. 26, 2006, 21 pgs.
Chacon, Git, The Fast Version Control System, Oct. 3, 2011, 3 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org; Oct. 2, 2011, 6 pages.
Module: Mongoid: Versioning, http://rdoc.info, Documentation by YARD 0.7.2, 6 pages Oct. 3, 2011.
Noach, Database Schema under Version Control, code.openarck.org, Apr. 22, 2010, 6 pages.
Reiser FS, http://enwikipedia.org, Sep. 17, 2011, 5 pgs.
Rice, Extension Versioning, Update and Compatibility, Aug. 9, 2011, 11 pgs.
Rice, Toolkit Version Format, Aug. 19, 2011, 4 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
Vijaykumar, Speculative Versioning Cache, Dec. 1, 2001, 13 pgs.
WAFL—Write Anywhere File Layout, 1999, 1 pg.
Write Anywhere File Layout, Sep. 9, 2011, 2 pgs.
ZFS, , http://en.wikipedia.org Sep. 30, 2011, 18 pgs.
Chockler, Active Disk Paxos with infinitely many processes, Springer-Verlag, Apr. 2005, 12 pgs.
Dwork, Concensus in the presence of partial synchrony, MIT, 1988, 6 pgs.
Guerraoui, A Leader Election Protocol for Eventually Synchronous Shared Memory Systems, IEEE, 2006, 6 pgs.
Lamport, Cheap Paxos, Microsoft, 2004, 9 pgs.
Lamport, Fast Paxos, Microsoft, Jul. 2005, 43 pgs.
Lamport, Generalized Consensus and Paxos, Microsoft, Mar. 2004, 25 pgs.
Lamport, Paxos Made Simple, Nov. 2001, 14 pgs.
Malkhi, Lecture notes in computer science [Section: Omega Meets Paxos, Leader election and stability without eventual timely links], 2005, pp. 199-213.
Pease, Reaching Agreement in the Presence of Faults, ACM, 1980, pp. 228-234.
Schneider, Implementing fault tolerant services using the state machine, Cornell Univ., 1990, 21 pgs.

* cited by examiner

FINE GRAINED ADAPTIVE THROTTLING OF BACKGROUND PROCESSES

FIELD OF THE INVENTION

The present invention generally relates to adjusting the throttling of background processes at a high degree of precision.

BACKGROUND

Processes executing on a computer system will often require access to shared resources of the computer system, such as memory and the CPU, to meet quality of service (QoS) requirements and expectations. A process that executes in the background (a "background process") may be required to execute on a regular basis. Typical examples of a background process include an anti-virus program and a backup program. However, the execution of background processes may have a negative impact to the quality of service of other processes due to conflicts with shared resources. For example, a background process that is taking a relatively large portion of the CPU's availability will result in other processes having less access to the CPU. Shared resources can become saturated by background process. When a process accesses a saturated resource, their access is delayed and the average response time increase, thereby causing the execution of the process, and the computer system as a whole, to slow down.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1A:
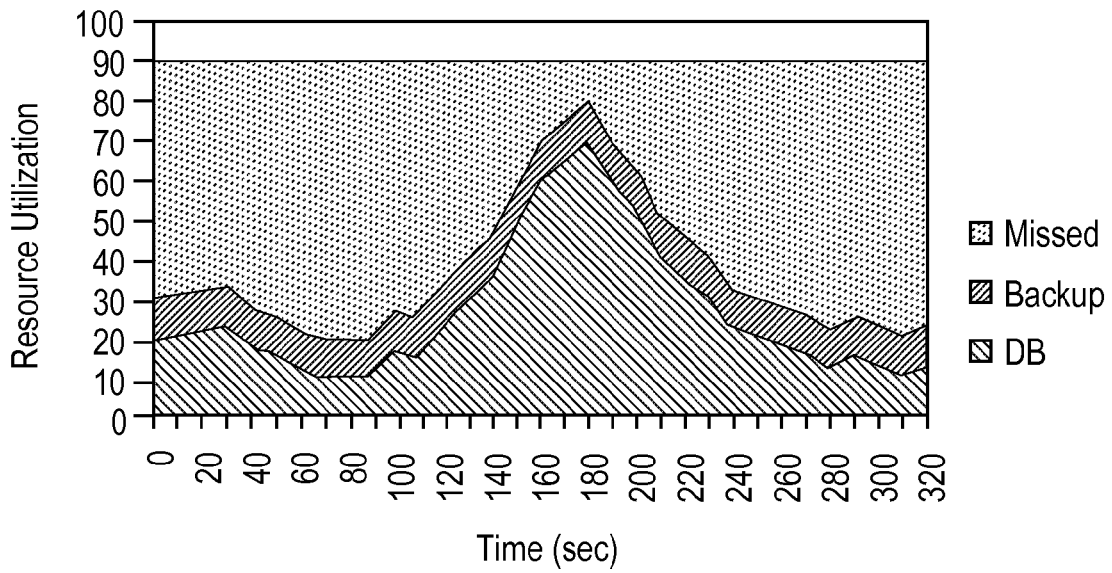
FIG. 1A is a graph illustrating under utilization of a shared resource using static throttling according to prior approaches.

Approaches for dynamically adjusting a frequency at which the one or more background processes are executed at a high degree of precision are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Background Processes and Foreground Processes

Embodiments of the invention advantageously enable background processes to be dynamically throttled at a high degree of precision. As a result, the utilization of shared resources may be safely maintained at higher levels of utilization than by prior approaches. Before discussing how embodiments of the invention may be employed, it will be helpful to appreciate the differences between a background process and a foreground process. As used herein, a background process is a process designed to run in the background to perform a supportive function to a foreground process. A foreground process, as used herein, is a process that provides functionality central to the role of a device upon which the process executes. Foreground processes typically interact with a user and/or performs application level activity. Non-limiting, illustrative examples of functionality performed by a background process include making a backup copy of data and running an antivirus program. Non-limiting, illustrative examples of foreground processes include operating systems, database servers, text editors, and multimedia players.

Observed Limitations of the Prior Art

It is observed that prior approaches for managing the execution of background processes exhibit many limitations and disadvantages. One approach for managing the executing rate of a background process according to known techniques is the "noop" approach. In the "noop" approach, both background processes and foreground processes are dispatched in the order in which they are received. A disadvantage with this technique is that it provides no protection against over saturation of a shared resource. For example, if a set of foreground processes are highly utilizing a shared resource, executing a high load of background processes may over saturate the shared resource and subsequently degrade performance of the foreground processes.

According to another prior art approach termed "static throttling," the frequency at which background processes are dispatched to the CPU is either static or changes infrequently. For example, in the static throttling approach, a background process may be configured to have 1000 IO operations per second. Static throttling is problematic in that it virtually always under utilizes or over utilizes shared resources, as it is difficult to accurately predict how much foreground processes will utilize a shared resource.

FIG. 1A is a graph illustrating the under utilization of a shared resource over time using static throttling according to the prior art. In FIG. 1A, the foreground process is assumed to be a database server, the background process is assumed to be a backup process, and the shared resource is the CPU. As depicted in FIG. 1A, much of the utilization of the shared resource is missed.

Figure 1B:
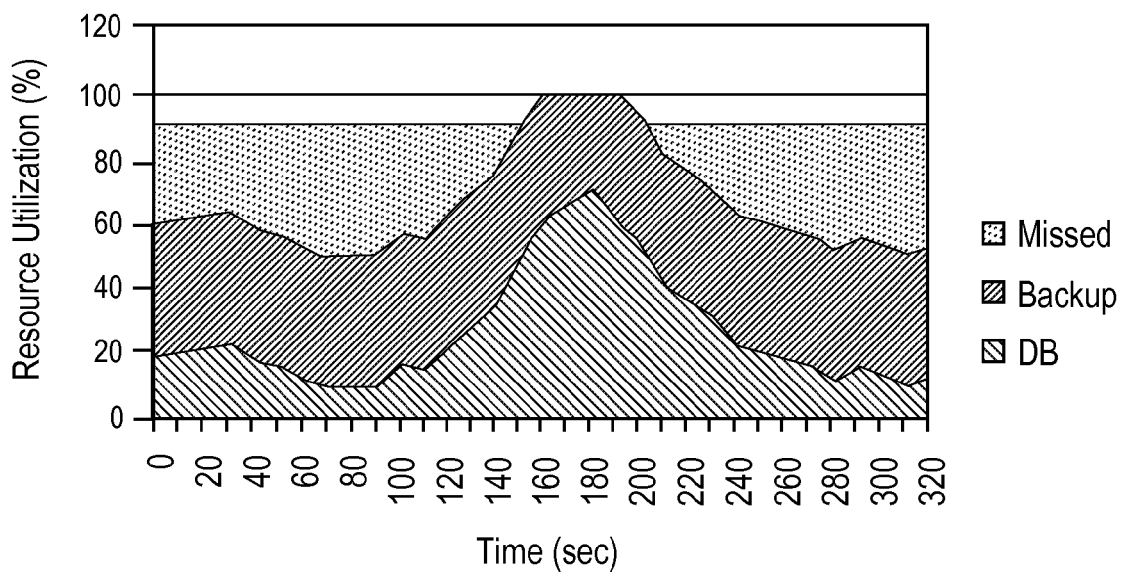
FIG. 1B is a graph illustrating over utilization of a shared resource using static throttling according to prior approaches.

FIG. 1B is a graph illustrating the over utilization of a shared resource using static throttling according to the prior art. As shown in FIG. 1B, at around 160 seconds, the limit of the shared resource is reached. Hitting the limit of the shared resource in this manner will cause the foreground processes to slow down, as the background processes are competing directly against the foreground processes for access to the shared resource. This unfortunate situation will result in performance degradation of the foreground processes and will slow down the computer system in a meaningful and noticeable way.

Another approach for managing the execution rate of background processes is called "deadline." In the "deadline" approach, an arbitrary deadline for when an IO is to occur is specified. For example, a process may be internally designated a one second deadline in which the IO operation requested by the process must occur. A scheduler may optimize the order in which IOs are issued as long as the performance of the IO operations still observers their assigned deadline. However, while the order in which IO operations are issued may change, the deadline approach is ineffective against addressing oversaturation of a shared resource, as the deadline approach does not consider how much or how little a shared resource is being used when reordering how IO operations are issued.

Another prior art approach for managing the execution rate of a background process is termed "CFQ," which stands for Completely Fair Queue. In the CFQ approach, when either a background process or a foreground process desires access to the CPU, each process is assigned to one of a group of queues. Each queue is provided a certain amount of access to the CPU. When it is a particular's queue's turn to access the CPU, the process at the end of that queue is granted access to the CPU. In this way, all processes are provided access to the CPU, but certain higher-priority processes may be provided greater access to the CPU (by virtue of being assigned to a faster moving queue) than other lower-priority processes. However, the CFQ approach is also ineffective against addressing oversaturation of a shared resource, as the CFQ approach does not consider how much or how little a shared resource is being used when assigning processes to queues or determining how frequently IO operations should occur.

Fine Grained Dynamic Throttling

Figure 2:
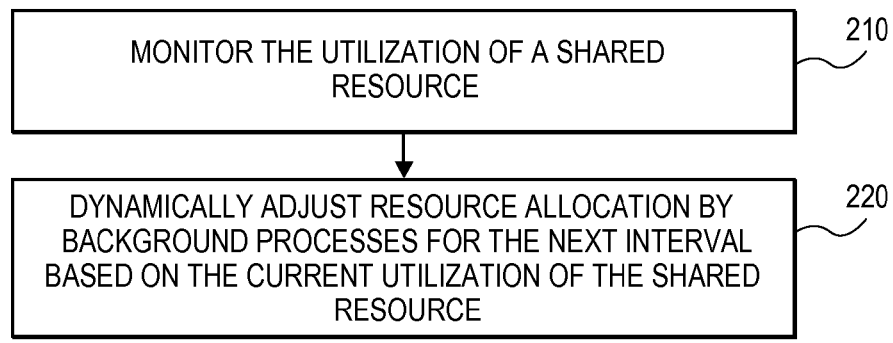
FIG. 2 is a flowchart illustrating the functional steps of fine grained dynamic throttling according to an embodiment of the invention.

FIG. 2 is a flow chart illustrating the functional steps of fine grained dynamic throttling according to an embodiment of the invention. Advantageously, by performing the steps of FIG. 2, a shared resource may be safely utilized at a higher rate than by prior approaches. Additionally, the steps of FIG. 2 prevent oversaturation of a shared resource so that performance degradation, particularly to foreground processes, will not occur as a result of background processes. The process depicted in FIG. 2 involves frequently monitoring the utilization of a shared resource, and then frequently adjusting the execution rate of background processes to ensure the shared resource is appropriately utilized. For example, the utilization of the shared resource may be checked one hundred times per second, and the use of the shared resource by background processes may be adjusted every ten milliseconds to ensure that the shared resource is not over utilized or underutilized. In this way, the adjustment of the execution rate of the background processes may be performed frequently enough that the execution rate of the background processes will be made with enough time to correct for any overutilization to ensure the quality of service of the foreground processes, also using the shared resource, is not impacted or degraded.

In step 210 of FIG. 1, the utilization of a shared resource that is used by one or more background processes is monitored. The purpose of step 210 is to identify, with precision, how busy is a particular resource that is potentially used by both background and foreground processes.

Embodiments of the invention may be used to monitor a wide-variety of shared resources. Non-limiting, illustrative examples of shared resources which may be monitored in step 210 include one or more central processing units (CPUs), memory, persistent storage, and access to a network resource.

In an embodiment, step 210 may be performed by accessing a statistics information file implemented by an operating system. To illustrate a concrete example, the Linux operating system supports the file "/proc/diskstats," which is a file that provides statistical information about resources of the computer system running the operating system. The "/proc/diskstats" file is updated with current statistical information about a wide variety of shared resources within a computer system each time the file is accessed. Internally, a function may be called to retrieve the statistical information when the file is read, and so this data is only retrieved as needed and is guaranteed to be current.

Step 210 may be performed frequently by embodiments to ensure that decisions regarding whether to increase or decrease the amount of IO operations issued by background processes are based on accurate data. For example, in one embodiment, step 210 may be performed at least five hundred times each second. In another embodiment, step 210 may be performed at least one thousand times each second. Other embodiments may perform step 210 in the range of one thousand to three thousand times per second. The particular frequency at which step 210 is performed will depend upon the characteristics of the computer system.

To provide a different perspective about how frequently step 210 may be performed by embodiments, in an embodiment, step 210 may be performed at least ten times as often as step 220 is performed. In another embodiment, step 210 may be performed at least one hundred times as often as step 220 is performed.

In step 220, the frequency at which one or more background processes are executed is adjusted without adjusting the frequency in which one or more foreground processes are executed. The purpose of step 220 is to ensure that the utilization of the shared resource is a great as possible without exceeding a threshold value. In certain embodiments, the threshold value may be less than 100% utilization, such as a value between 80-90% or 80-95% (e.g., 90% utilization), to provide some leeway room to ensure the load upon a shared resource is less than 100% of the capacity of the shared resource.

In an embodiment, step 220 is performed frequency to ensure that the utilization of the shared resources is optimized. In this way, the rate of which background resources access a shared resource may be quickly adjusted to ensure that any foreground process has priority to access the shared resource, but any excess capacity of the shared resource is used by background processes. As a result, step 220 may be performed many times each second. For example, to illustrate one example, step 220 may be performed at least eight times a second by one embodiment. Other embodiments may perform step 220 any number from eight to twenty times a second. Other embodiments may perform step 220 fifty or more times a second.

Figure 3:
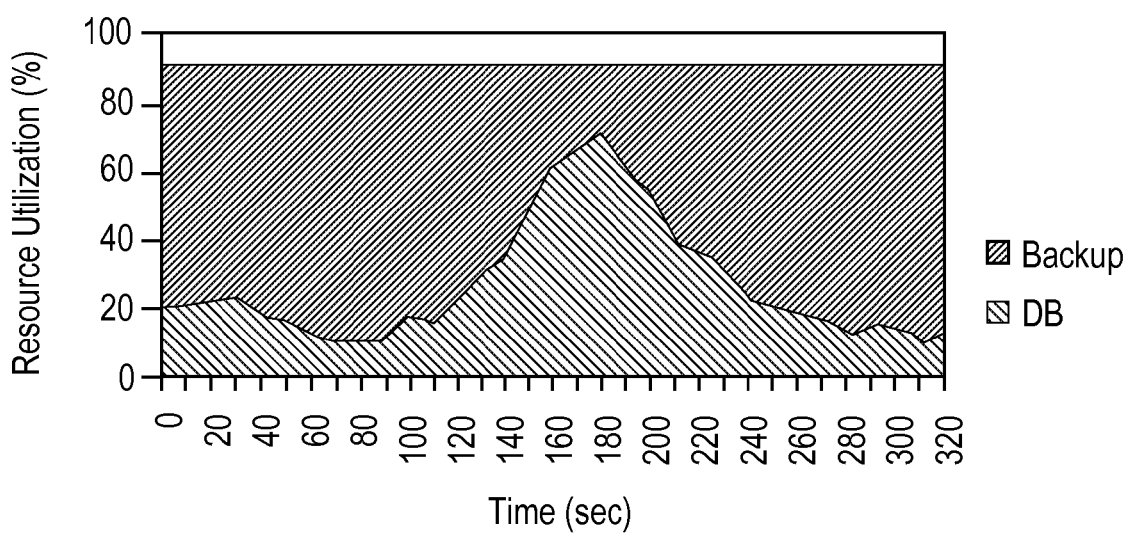
FIG. 3 is a graph illustrating the utilization of a shared resource over time for an embodiment of the invention.

In an embodiment, the frequent adjustment to frequency at which one or more background processes are executed enables shared resources to be better utilized without causing the shared resources to be over utilized. To illustrate this point, consider FIG. 3, which is a graph illustrating the utilization of a shared resource over time for an embodiment of the invention. As shown in FIG. 3, the utilization of the shared resource remains around 90% while one or more background processes are executing. Other embodiments of the invention may be configured to ensure that the utilization of shared resources remains at least a certain level, such as any level between 65%-90% utilization, when one or more background processes are executing.

In an embodiment of the invention, an additional threshold (the "ceiling threshold") may be established and used. When, in performing step 210, if the shared resource is being utilized greater than the ceiling threshold, then the threshold value used in step 210 may be automatically decreased, without human intervention, so that the shared resource does not exceed 100% utilization. The use of a ceiling threshold may be helpful in those embodiments where there is a lag time between when the threshold value is adjusted and when an impact upon the utilization of the shared resource is felt. If there is a delay in the impact upon the utilization of the shared resource when the threshold is updated, then using a ceiling threshold may be advantages to ensure the utilization of the shared resource stays below 100%.

For example, assume that the threshold value in step 210 is set at 88%. Further assume that the ceiling threshold is set at 95%. If the utilization of the shared resource is determined to exceed the ceiling threshold of 95%, then the threshold value of 88% may be dynamically lowered to ensure that the shared resource does not exceed 100% utilization, which would result in foreground processes having their quality of services diminished.

Computer system will employ many different shared resources and it is contemplated that embodiments may be used with many different numbers and types of shared resources. Further, each shared resource of an embodiment may have a different threshold. Consequently, the threshold associated with one shared resource may be completely independent from the threshold associated with a different resource. For example, persistent storage volume A may correspond to a hard-disk drive and have a threshold of 85% utilization, while persistent storage volume B may correspond to a different hard-disk drive or a solid state device and may have a threshold of 90%.

Note that certain embodiments may expose an interface wherein a user may update or configure the threshold value of a shared resource. In other embodiments, the threshold value of a shared resource may be programmatically determined or updated based upon heuristics and analysis. Such heuristics and analysis may be performed upon data about the shared resources retrieved in step 210.

To illustrate how an embodiment may be used with reference to a shared network resource, assume that two servers, denoted server A and server B, communicate with each over a one gigabyte network link. Further assume that server B becomes inoperable and, at a later point in time, comes back online. Sever A and server B each contained four databases, and the contents of the four databases on server B mirrored the contents of the four databases on server A. When server B comes back online, a recovery process will be initiated for each of the four databases on server B. Data will be copied from server A to server B to synchronize the contents of the four database on server B with the contents of the four databases on server A.

If only one instance of a database were undergoing recovery, then perhaps it could fully utilize the capacity of the communications link. However, traffic related to the recovery process is not the only type of communications carried over the communications link. Since server A and server B are in a cluster, membership communications or heartbeats are also exchanged over the communications link. If a member of the cluster fails to receive a heartbeat from a particular member of the cluster, the member may conclude that the particular member for whom a heartbeat message hasn't been received has gone down, which may be an erroneous conclusion. Thus, the recovery process for each instance needs to be aware that other processes wish to use the communications link. If each recovery process were to be allowed to fully utilize the communications link, the utilization of the communications link may effectively be over 100%, which would negatively impact foreground processes, such as heartbeat messages. Embodiments described herein present a solution by allowing background processes, such as a recovery process, to use only the excess utilization of a shared resource not used by foreground processes.

Embodiments of the invention may be implemented in a variety of different environments and programming entities. For example, embodiments may be implemented in an application or application operating environment.

Dynamic Adjustment of Block Size

Embodiments of the invention may be used to perform certain background processes, such as a backup process, more efficiently than prior approaches. In an embodiment of the invention wherein the background process is coping data, such as when a backup of a database or other data store is made, in addition to performing steps 210 and 220 of FIG. 2, the block size of data copied may be dynamically optimized.

Figure 4:
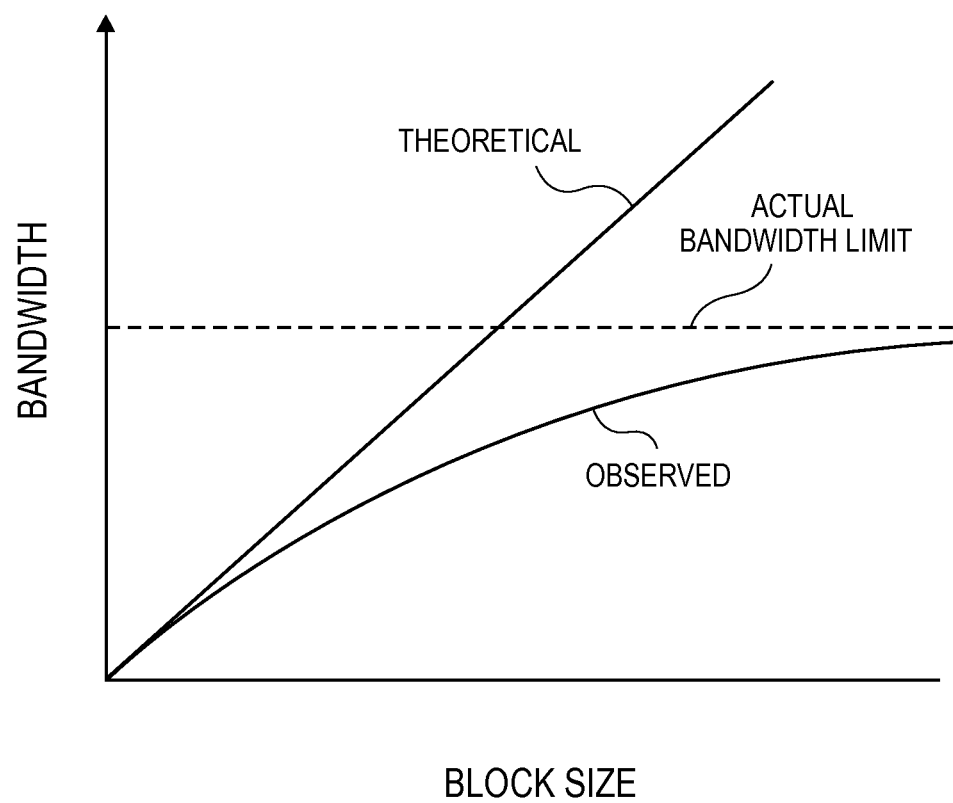
FIG. 4 is a graph illustrating a comparison of bandwidth versus block size according to an embodiment of the invention.

FIG. 4 is a graph illustrating a comparison of bandwidth versus block size according to an embodiment of the invention. As shown in FIG. 4, theoretically, an increase in the bandwidth of a communications link should accommodate a larger block size. At some point, there will be an actual bandwidth limit associated with any physical communications link.

Utilization of persistent storage will increase with block size. However, as shown in FIG. 4, the observed behavior of an optimal block size will vary based on the available bandwidth of a communications link. Therefore, embodiments of the invention may dynamically determine a block size in which data should be copied or otherwise carried over a communications link based upon the available bandwidth in the communications link at that point in time.

Thus, in an embodiment, after performing step 210, alternatively or in addition to performing step 220, the block size of data copied by a background process is dynamically adjusted based upon the utilization for a shared resource, such as a communications link.

Implementing Mechanisms

Figure 5:
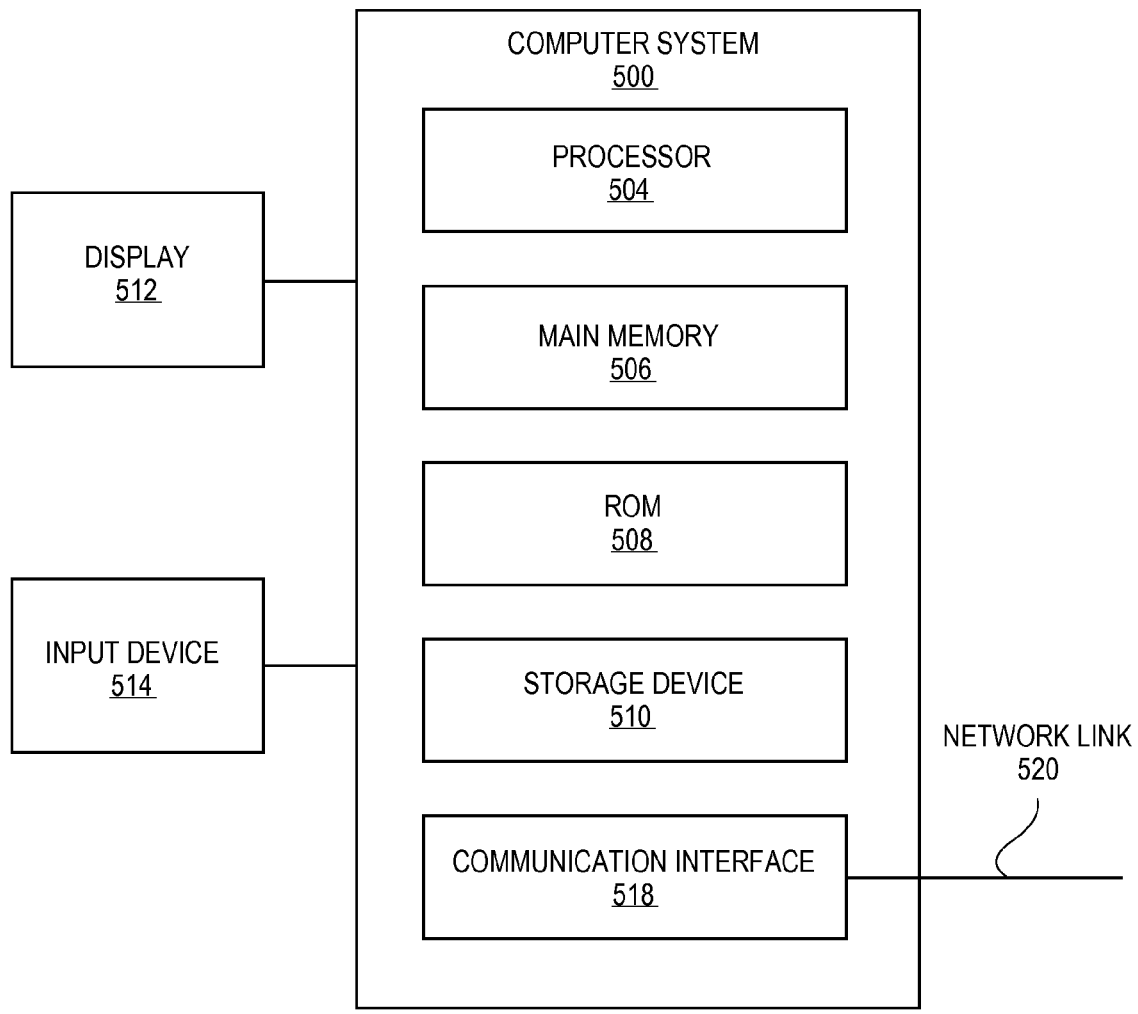
FIG. 5 is a block diagram that illustrates a computer system upon which an embodiment of the invention may be implemented.

In an embodiment, embodiments of the invention may be implemented on or using a computer system. FIG. 5 is a block diagram that illustrates a computer system 500 upon which an embodiment of the invention may be implemented. In an embodiment, computer system 400 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments of the invention may include any number of input devices 514 coupled to computer system 500.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more computer readable non-transitory storage mediums storing one or more sequences of instructions, which when executed by one or more processors, cause:
monitoring utilization of a shared resource by one or more background processes and one or more foreground processes, wherein the one or more foreground processes and the one or more background process execute at respective frequencies of execution;
dynamically adjusting a frequency at which the one or more background processes are executed based on a comparison of a current utilization of the shared resource with a threshold value, without adjusting the frequency in which the one or more foreground processes are executed, the dynamically adjusting including decreasing the frequency of the one or more background processes in accordance with a determination that the current utilization is above the threshold value;
determining, without user input, whether the monitored utilization of the shared resource exceeds a ceiling threshold value which is greater than the threshold value, wherein the threshold value and the ceiling threshold value correspond to resource utilization levels;
in accordance with a determination that the monitored utilization of the shared resource exceeds the ceiling threshold value, updating, without user input, the threshold value; and
dynamically adjusting a frequency at which the one or more background processes are executed based on a comparison of the current utilization of the shared resource with the updated threshold value.

2. The one or more computer readable non-transitory storage mediums of claim 1, wherein monitoring is performed at least five hundred times each second.

3. The one or more computer readable non-transitory storage mediums of claim 1, wherein monitoring is performed at least one thousand times each second.

4. The one or more computer readable non-transitory storage mediums of claim 1, wherein monitoring is performed at least ten times as often as dynamically adjusting is performed.

5. The one or more computer readable non-transitory storage mediums of claim 1, wherein monitoring is performed at least one hundred times as often as dynamically adjusting is performed.

6. The one or more computer readable non-transitory storage mediums of claim 1, wherein dynamically adjusting is performed at least eight times a second.

7. The one or more computer readable non-transitory storage mediums of claim 1, wherein the threshold value is a particular value in a range of 80% to 90% of the utilization capacity of the shared resource.

8. The one or more computer readable non-transitory storage mediums of claim 1, wherein each of the one or more background processes is a process designed to run in the background to perform a supportive function to a foreground process, and wherein each of the one or more foreground processes is a process that interacts with a user, performs application level activity, or provides functionality central to the role of a device upon which the process executes.

9. The one or more computer readable non-transitory mediums of claim 1, wherein the shared resource is one or more central processing units (CPUs).

10. The one or more computer readable non-transitory storage mediums of claim 1, wherein the shared resource is memory.

11. The one or more computer readable non-transitory storage mediums of claim 1, wherein the shared resource is persistent storage.

12. The one or more computer readable non-transitory storage mediums of claim 1, wherein the shared resource is a network resource.

13. The one or more computer readable non-transitory storage mediums of claim 1, further comprising dynamically adjusting a block size of data copied by a background process based upon the monitored utilization for a shared communications resource.

14. The one or more computer readable non-transitory storage mediums of claim 1, wherein monitoring the utilization of the shared resource comprises accessing a statistics information file implemented by an operating system.

15. The one or more computer readable non-transitory storage mediums of claim 1, wherein execution of the one or more sequences of instructions, which when executed, further cause the utilization of the shared resource to be at least 65% when the one or more background processes are executing.

16. A method for throttling backgrounds processes to a high degree of precision, comprising:
    monitoring utilization of a shared resource by one or more background processes and one or more foreground processes, wherein the one or more foreground processes and the one or more background process execute at respective frequencies of execution;
    dynamically adjusting a frequency at which the one or more background processes are executed based on a comparison of a current utilization of the shared resource with a threshold value, without adjusting the frequency in which the one or more foreground processes are executed, the dynamically adjusting including decreasing the frequency of the one or more background processes in accordance with a determination that the current utilization is above the threshold value;
    determining, without user input, whether the monitored utilization of the shared resource exceeds a ceiling threshold value which is greater than the threshold value, wherein the threshold value and the ceiling threshold value correspond to resource utilization levels;
    in accordance with a determination that the monitored utilization of the shared resource exceeds the ceiling threshold value, updating, without user input, the threshold value; and
    dynamically adjusting a frequency at which the one or more background processes are executed based on a comparison of the current utilization of the shared resource with the updated threshold value.

17. An apparatus, comprising:
    one or more processors; and
    one or more computer readable storage medium storing one or more sequences, which when executed by the one or more processors, cause:
    monitoring utilization of a shared resource by one or more background processes and one or more foreground processes, wherein the one or more foreground processes and the one or more background process execute at respective frequencies of execution;
    dynamically adjusting a frequency at which the one or more background processes are executed based on a comparison of a current utilization of the shared resource with a threshold value, without adjusting the frequency in which the one or more foreground processes are executed, the dynamically adjusting including decreasing the frequency of the one or more background processes in accordance with a determination that the current utilization is above the threshold value;
    determining, without user input, whether the monitored utilization of the shared resource exceeds a ceiling threshold value which is greater than the threshold value, wherein the threshold value and the ceiling threshold value correspond to resource utilization levels;
    in accordance with a determination that the monitored utilization of the shared resource exceeds the ceiling threshold value, updating, without user input, the threshold value; and
    dynamically adjusting a frequency at which the one or more background processes are executed based on a comparison of the current utilization of the shared resource with the updated threshold value.

18. The apparatus of claim 17, wherein the shared resource is one or more central processing units (CPUs).

19. The apparatus of claim 17, wherein the shared resource is memory.

20. The apparatus of claim 17, wherein the monitoring is performed at least ten times as often as the dynamically adjusting is performed.

* * * * *